June 9, 1959 L. G. FAIRHURST 2,889,888
PITCH LOCK FOR HYDRAULIC PITCH PROPELLER
Filed May 3, 1956
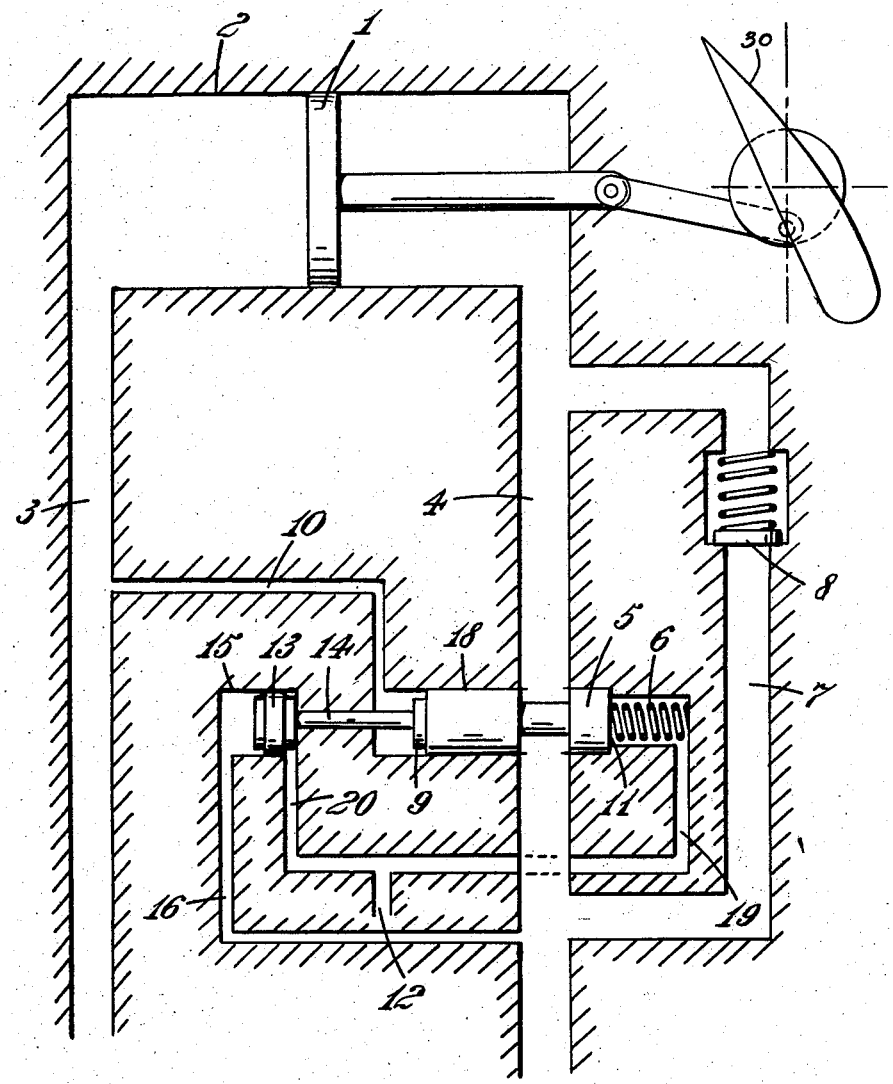

United States Patent Office 2,889,888
Patented June 9, 1959

2,889,888

PITCH LOCK FOR HYDRAULIC PITCH PROPELLER

Leonard Gaskell Fairhurst, Gloucester, England, assignor to Rotol Limited, Gloucester, England, a British company Application May 3, 1956, Serial No. 582,485

Claims priority, application Great Britain May 5, 1955

8 Claims. (Cl. 170—160.31)

This invention relates to hydraulically operated variable pitch propellers of the kind, hereinafter referred to as the kind described, including a double acting hydraulic pitch change motor actuable by hydraulic fluid under pressure to adjust the pitch of the propeller, an hydraulic fluid conduit (the coarse pitch conduit) for leading hydraulic fluid under pressure to said pitch change motor to actuate the motor in the sense to adjust the pitch of the propeller towards coarse pitch, and an hydraulic fluid conduit (the fine pitch conduit) for leading hydraulic fluid under pressure to said pitch change motor to actuate the motor in the sense to adjust the pitch of the propeller towards fine or reverse pitch.

For the purpose of preventing fining off of the pitch of the propeller in the event of a serious leakage of hydraulic fluid from the hydraulic system of the propeller, for example by fracture of the fine pitch or the coarse pitch conduit, it has been proposed to provide a lock valve in the coarse pitch conduit which is maintained open against a closing force by a predetermined excess of pressure in the fine pitch conduit over drain pressure.

The pitch control of variable pitch propellers of the kind described is effected by means of an hydraulic valve which is displaceable from an equilibrium position to supply hydraulic fluid under pressure to said pitch change motor through either said fine pitch conduit or said coarse pitch conduit to adjust the pitch of the propeller towards fine pitch or coarse pitch respectively and this hydraulic valve is usually controlled by a speed governor, the speed governor and the valve being combined in a constant speed governor unit. The operation of such an hydraulic valve normally involves the generation of transient pressure fluctuations simultaneously in the coarse pitch and fine pitch conduits, such transient pressure fluctuations being of opposite sign in these two conduits. The existence of such transients in the fine pitch conduit makes it difficult to select a pressure difference between drain pressure and the pressure in the fine pitch conduit at which the lock valve shall close to provide an adequate degree of safety without unnecessarily disturbing the normal operation of the propeller.

To obviate this difficulty, according to the present invention, there is provided in a propeller of the kind described a lock valve in the coarse pitch conduit which lock valve is urged in the opening direction, against a closing force tending to close the valve, by opening means comprising a first member subject to the difference between the pressure in the fine pitch conduit and drain pressure, a second member subject to the difference between the pressure in the coarse pitch conduit and drain pressure and means for combining the loads produced upon the said first and second members by the said pressures and for acting upon the said lock valve with the said combined load, the arrangement being such that the combined load remains substantially constant when transient pressure fluctuations of opposite sign occur simultaneously in the coarse pitch conduit and the fine pitch conduit.

The propeller preferably also includes a non-return valve in a conduit by-passing the lock valve, the non-return valve being arranged to close when the pressure on the pitch change motor side of the non-return valve exceeds that on the other side of the non-return valve.

One embodiment of the present invention will now be described, merely by way of example, with reference to the accompanying drawing which diagrammatically illustrates a variable pitch propeller according to the present invention.

Referring to the drawing, the propeller comprises a plurality of variable pitch propeller blades one of which is indicated at 30, and a double acting hydraulic pitch change motor, the pitch-change piston 1 of which is connected to adjust the pitch of the blades. The piston operates in a cylinder 2 the ends of which are connected by conduits 3 and 4 to the control ports of a constant speed governor unit, not shown. Hydraulic fluid supplied under pressure through the conduit 3 acts on the left hand side of piston 1, tending to move it in a direction giving a finer pitch setting in ahead pitch of the propeller, or a coarser pitch in the reverse range in the case of a reversing propeller. The conduit 3 is accordingly the fine pitch conduit. Conversely, hydraulic fluid supplied under pressure through the conduit 4 tends to move the piston 1 in a direction giving a coarser pitch setting in ahead pitch of the propeller and the conduit 4 is accordingly the coarse pitch conduit.

A lock valve 5, in the form of a piston, is provided in the coarse pitch conduit 4 and the lock valve 5 is urged in the direction to close the conduit 4 by a closing force produced by a spring 6. When the valve 5 is closed, hydraulic fluid is trapped in the right hand end of the cylinder 2, and prevents movement of the piston 1 to the right in the drawing, that is to say in the pitch-fining direction, in which direction the piston 1 normally tends to move under the action of the centrifugal twisting moment on the propeller blades when the propeller is rotating. A conduit 7 is provided which by-passes the valve 5. The conduit 7 contains a non-return valve 8 arranged to close when the pressure on the pitch change motor side of the valve 8 exceeds that on the other side of the valve 8. The hydraulic fluid trapped in the right hand end of the cylinder 2 when the valve 5 closes consequently cannot escape through the valve 8 but hydraulic fluid under pressure supplied through the conduit 4 can enter the right hand end of the cylinder 2 to coarsen the pitch of the propeller as soon as its pressure exceeds, by a predetermined amount, the pressure of the hydraulic fluid trapped in the cylinder.

The valve 5 is slidable in a cylinder 18 which is communicated on the side 9 of the valve 5, by means of a duct 10 with the fine pitch conduit 3 and on the side 11 of the valve 5 by means of a duct 19 with a drain conduit 12. The valve 5 is accordingly urged in the opening direction against the closing force produced by the spring 6 by a load which is proportional to the difference between the pressure in the fine pitch conduit 3 and the pressure in the drain conduit 12. In addition to this opening load a further opening load is provided by a further piston and cylinder assembly 13, 15. The piston 13 has a piston rod 14 which bears against the end 9 of the valve 5. The left hand end of the cylinder 15 is communicated by a duct 16 with the coarse pitch conduit 4 and the right hand end of the cylinder is communicated by a duct 20 with the drain conduit 12. During normal working of the propeller, at least when the latter is in an "on speed" or an "over-speed" condition, by which should be understood rotating either at the speed called for by the constant speed unit or a speed in excess of the speed called for by the constant speed unit, pressure in excess of drain pressure is present in the coarse pitch conduit 4 and a load is consequently produced upon the piston 13 proportional to the difference between these pressures, this load being added to the load acting directly upon the valve 5 to hold the valve open against the closing force produced by the spring 6. Opening and closing of the control valve of the constant speed unit during operation of the propeller causes fluctuating pressures in the fine pitch and coarse pitch conduits 3 and 4 but these fluctuations are of opposite sign in the two conduits so that the combined opening load upon the valve 5 remains substantially constant. Thus when the propeller is in an "underspeed condition" by which should be understood rotating at a speed less than is called for by the constant speed unit, although the pressure in the coarse pitch conduit may fall to a pressure approaching the drain pressure due to operation of the constant speed unit calling for a finer pitch, the pressure in the fine pitch conduit will rise sufficiently to maintain the valve 5 open against the closing force produced by the spring 6. To balance any inequality in the fluctuations of pressure in the fine and coarse pitch conduits due to the operating of the control valve of the constant speed unit, the piston 13 and the valve 5 may be made with correspondingly different face areas.

In the event of a serious loss of hydraulic fluid from the hydraulic system of the propeller, due, for example, to fracture of one of the conduits 3 and 4, the pressure in at least one of the conduits 3 and 4 will drop immediately, thus reducing the load in the opening direction upon the valve 5, and it is arranged that such a reduction of load is sufficient to allow the spring 6 to close the valve 5 and thus prevent a loss of propeller pitch.

In the example described the lock valve 5 is a piston type valve. The lock valve may however take the form of a lift valve to ensure maximum fluid tightness when closed.

I claim:

1. A variable pitch propeller comprising a plurality of variable pitch propeller blades, a double acting hydraulic pitch change motor connected to adjust the pitch of said blades, said motor being actuable in one direction to adjust the blades towards coarse pitch and in the other direction to adjust the blades towards fine pitch, coarse pitch fluid conduit means for leading hydraulic fluid under pressure to said motor to actuate said motor in said one direction, fine pitch fluid conduit means for leading hydraulic fluid under pressure to said motor to actuate said motor in said other direction, a lock valve in said coarse pitch fluid conduit means, means providing a closing force tending to close said lock valve, and opening means urging said lock valve in the opening direction against the action of said closing means, said opening means comprising a first member subject to the difference between the pressure in said fine pitch fluid conduit means and drain pressure, a second member subject to the difference between the pressure in said coarse pitch fluid conduit means and drain pressure, and means operatively connecting said first and second members for combining the loads produced upon the said first and second members by the said pressures and for acting upon the said lock valve with the said combined load.

2. A propeller as claimed in claim 1, comprising a fluid conduit by-passing said lock valve, and a non-return valve in said fluid conduit, the non-return valve being arranged to close when the pressure on the pitch change motor side of the non-return valve exceeds that on the other side of the non-return valve.

3. A propeller as claimed in claim 1, wherein said closing force is produced by spring means.

4. A propeller as claimed in claim 1, wherein said opening means comprises a first piston and cylinder assembly of which the piston constitutes said first member, duct means communicating the cylinder on one side of the piston with said fine pitch fluid conduit means, and duct means communicating the cylinder on the other side of the piston with a drain.

5. A propeller as claimed in claim 4, wherein said opening means further comprises a second piston and cylinder assembly of which the piston constitutes said second member, duct means communicating the cylinder on one side of the piston with said coarse pitch fluid conduit means, and duct means communicating the cylinder on the other side of the piston with a drain.

6. A propeller as claimed in claim 5, wherein the load produced on the piston of said second piston and cylinder assembly is applied to said lock valve through the piston of the first piston and cylinder assembly.

7. A propeller as claimed in claim 6, wherein the piston of said second piston and cylinder assembly has a piston rod which bears against the side of the piston of the first piston and cylinder assembly which is exposed to the pressure in said fine pitch fluid conduit means.

8. A propeller as claimed in claim 4, wherein said lock valve is a piston type valve, and the piston of said first piston and cylinder assembly forms the lock valve.

References Cited in the file of this patent

UNITED STATES PATENTS

| 2,745,499 | Berninger et al. | May 15, 1956 |
| 2,748,877 | Miller et al. | June 5, 1956 |

FOREIGN PATENTS

| 562,845 | Great Britain | July 19, 1944 |